United States Patent [19]
Hillis

[11] Patent Number: 6,028,936
[45] Date of Patent: Feb. 22, 2000

[54] METHOD AND APPARATUS FOR AUTHENTICATING RECORDED MEDIA

[75] Inventor: W. Daniel Hillis, Toluca Lake, Calif.

[73] Assignee: Disney Enterprises, Inc., Burbank, Calif.

[21] Appl. No.: 08/731,569

[22] Filed: Jan. 16, 1996

[51] Int. Cl.[7] .............................. H04K 1/00; H04L 9/00; G11B 23/28; G07D 7/00

[52] U.S. Cl. .................................. 380/23; 380/25; 380/3; 380/4; 340/825.34

[58] Field of Search .............................. 380/3, 4, 23, 25; 340/825.3, 825.34

[56] References Cited

U.S. PATENT DOCUMENTS

5,367,148  11/1994  Storch et al. ............................ 235/375
5,434,917  7/1995  Nacchache et al. ....................... 380/23

*Primary Examiner*—Gail O. Hayes
*Assistant Examiner*—Hrayr A. Sayadian
*Attorney, Agent, or Firm*—Hecker & Harriman

[57] ABSTRACT

An authentic media protection system is described. Every recorded media includes a digital signature, a list of known counterfeit media identifiers, and counterfeit media response information. The digital signature is a unique encrypted combination of a recorded media serial number and samples of substantive information recorded on the media. The playback unit performs a series of authenticating steps before playing or reading recorded media. The playback unit independently verifies the encrypted digital signature to detect forgeries. The playback unit stores a recorded media identifier for each recorded media that is played in a cumulative list. This cumulative list is compared with the lists of known counterfeit media stored on each recorded media to determine whether the playback unit has played a counterfeit media. If the playback unit determines it has played a counterfeit media then it executes a counterfeit media response routine. Playback units can also store a cumulative list of known counterfeit media that it reads from each recorded media it plays. It then can check the authenticity of each new recorded media based on the internally stored list of known counterfeit media. Upon detection of counterfeit media a counterfeit response routine can be executed ranging in severity from merely displaying a warning message to shutting down the playback unit and requiring an authorized technician to unlock the unit.

18 Claims, 4 Drawing Sheets

METHOD AND APPARATUS FOR AUTHENTICATING RECORDED MEDIA

BACKGROUND OF THE INVENTION

1. Field of the Invention

This invention relates to the field of recorded media authentication systems.

2. Background Art

The reductions in cost and improvements in the quality of recorded media reproduction systems have created a need for a system to protect against counterfeiting of recorded media. Analog recordings are typically manufactured using a high quality master recording and expensive recording equipment to produce quality authorized recordings for distribution. This is applicable to phonograph records and is also true of cassettes. Thus typically the recording quality of a counterfeit copy of a distributed analog recorded media is lower in quality than an authorized analog recording.

This situation changed with the advent of digital recording and playback technology. A digital copy of a digital recording duplicates the recorded information in the original. Therefore counterfeiters can make counterfeit digital copies of distributed recorded media with little or no loss of recording signal quality.

Because counterfeiters do not compensate the creators of the recorded information, counterfeiters can sell the recorded media for lower prices than authorized recordings. The sales of counterfeit recordings can reduce the sales of authorized recorded media and thereby diminish the ability of creators of work product recorded on media to earn a living from their efforts.

Counterfeit recorded media is often produced without the benefit of the quality control standards employed by authorized manufacturers of recorded media. As a result consumers who purchase recorded media, without knowledge that it is a counterfeit, may be deceived by paying for a recorded media with the expectation of receiving a quality authorized recording and actually receiving an inferior product.

Other than the issue of the typically inferior quality control, the average user of recorded media today has no incentive to report counterfeit recorded media, such as compact discs, and laser discs. Thus an authentic media detection system is required which provides consumers incentives to avoid using counterfeit recorded media, and empowers consumers to detect counterfeit media which will then encourage distributors to ensure that they provide only authorized recorded media.

SUMMARY OF THE INVENTION

The present invention authentic media protection system comprises an integrated system incorporating encoded authentication information stored on recorded media and playback units with authentication verification hardware and software.

In one embodiment, every recorded media includes a digital signature, a list of identities or known counterfeit media, and counterfeit media response information. The digital signature is a unique encrypted combination of a recorded media serial number and samples of substantive information recorded on the media. A playback unit performs a series of authenticating steps before playing or reading recorded media. The playback unit independently verifies the encrypted digital signature to detect forgeries. The playback unit stores a recorded media identifier for each recorded media that is played in a cumulative list. This cumulative list is compared with the lists of known counterfeit media stored on each recorded media to determine whether the playback unit has played a counterfeit media. If the playback unit determines it has played a counterfeit media then it executes a counterfeit media response routine.

Playback units can also store a cumulative list of known counterfeit media that it reads from each recorded media it plays. It then can check the authenticity of each new recorded media based on the internally stored list of known counterfeit media.

Upon detection of counterfeit media a counterfeit response routine can be executed ranging in severity from merely displaying a warning message to shutting down the playback unit and requiring an authorized technician to unlock the unit.

DETAILED DESCRIPTION OF THE INVENTION

The present invention is directed to a method and apparatus for authenticating recorded media. In the following description, numerous specific details are set forth to provide a more thorough understanding of the present invention. It will be apparent, however, to one skilled in the art, that the present invention may be practiced without these specific details. In other instances, well-known features have not been described in detail so as not to unnecessarily obscure the present invention.

The present invention authentic media protection system provides an incentive directly to consumers to avoid counterfeit media. Increasing the importance to consumers of avoiding counterfeit media in turn applies pressure on distributors to make avoiding counterfeit media a part of their on-going efforts to provide customer satisfaction. The present invention authentic media protection system comprises an integrated system incorporating encoded authentication information stored on recorded media and playback units with authentication verification hardware and software.

Figure 1:
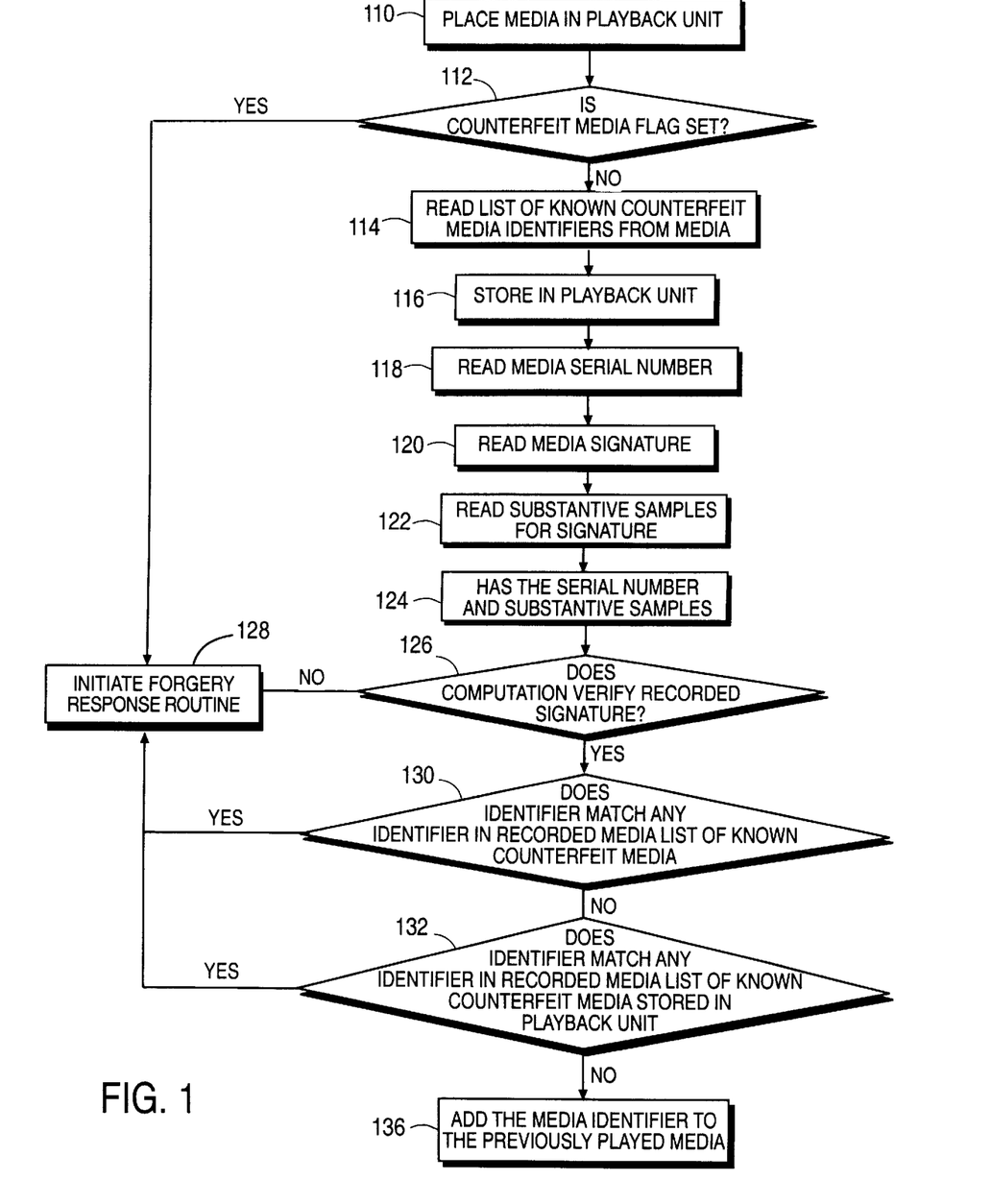
FIG. 1 illustrates the playback unit media authentication process of one embodiment of the present invention authentic media protection system.

In one embodiment, every recorded media includes a digital signature, a list of known counterfeit media identifiers, and counterfeit media response information. The digital signature is a unique encrypted combination of a recorded media serial number and samples of substantive information recorded on the media. The playback unit performs a series of authenticating steps before playing or reading recorded media. An overview of one embodiment of the playback unit recorded media authentication process is illustrated in FIG. 1. In step 110a recorded media is placed in a playback unit. In step 112 the playback unit checks whether a counterfeit media flag has been set which would indicate a counterfeit media recording had been detected earlier. If the flag is set then a counterfeit media response routine is executed in step 128. If the flag is not set then in step 114 the playback unit reads a list of known counterfeit media identifiers that is stored on the recorded media. In one embodiment, in step 116 the list of counterfeit media identifiers is also stored in the playback unit. In step 118 the playback unit reads the serial number stored on the recorded media. In step 120 the playback unit reads the digital signature stored on the recorded media. In step 122 the playback unit reads samples from the substantive material recorded on the media as an input for the digital signature. In step 124 the playback unit performs a hash operation on the serial number and the substantive samples. The playback unit then verifies the recorded signature in step 126. If the recorded signature fails the verification process then a counterfeit media response routine is initiated in step 128. If the signature is verified then the playback unit determines whether the recorded media identifier matches any of the identifiers stored on the recorded media in the list of known counterfeit media. If the identifier does match an identifier on the list then a counterfeit media response routine is executed. If there is not a match, then in step 132 the playback unit determines whether the recorded media identifier matches any identifiers stored in the list of known counterfeit media that is stored in the playback unit. If there is a match then a counterfeit media response routine is executed. If there is not a match then in step 136 the playback unit adds the recorded media identifier to the previously played recorded media identifier list.

The present invention authentic media protection system is applicable generally to recorded media. Many specific features of the present invention are directed to digital recorded media, and more particularly to recordings on reflective discs that can be read with a laser including compact discs for computers and audio playback units, as well as laser video discs. The present invention also applies to magnetically recorded media including digital audio tape, magnetic recording discs and cartridges.

1. PLAYBACK UNIT HARDWARE

Figure 3:
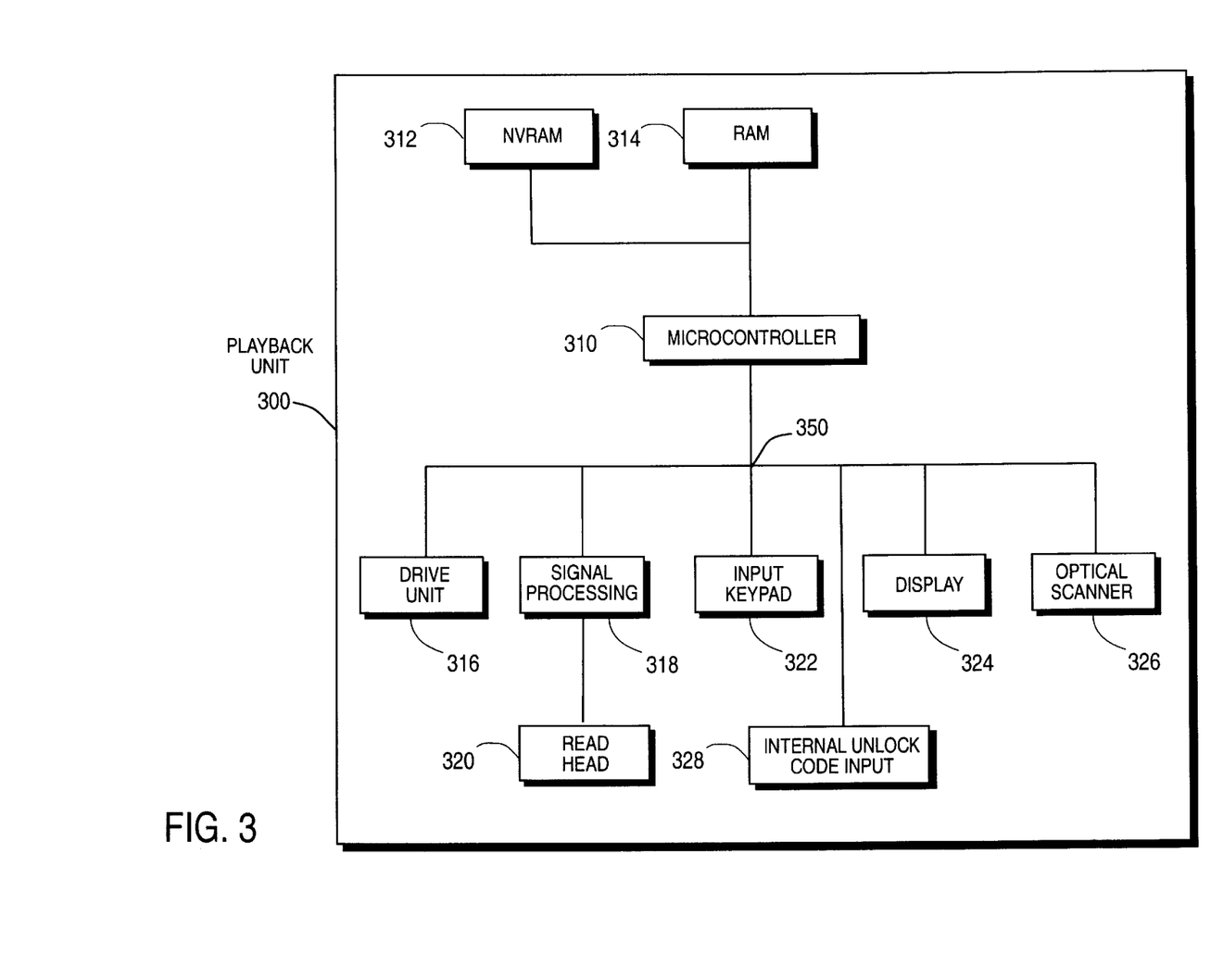
FIG. 3 illustrates a block diagram of a playback unit of one embodiment of the present invention.

FIG. 3 illustrates a block diagram of the playback unit 300. The term playback unit is used to refer generally to devices for reading recorded media, for example, compact disc players, compact disc drives for computers, and digital audio tape players. Microcontroller 310 is coupled to Random Access Memory ("RAM") 314 and Non-Volatile RAM ("NVRAM") 312. Alternatives to NVRAM include many forms of non-volatile memory, for example, flash type memory devices, or a magnetic storage device such as a hard disk drive. In the preferred embodiment, NVRAM 312 provides a long term memory capability that effectively stores information indefinitely, and that is not lost when power is removed from playback unit 300. Microcontroller 310 controls the operation of the other elements illustrated in FIG. 3. Microcontroller 310 is similar to controllers used in current playback units with the addition of enhanced calculation capabilities. Drive unit 316 is coupled to microcontroller 310 via node 350. Drive unit 316 comprises the motor and control electronics to move recorded media, for example, rotating a compact disc. Read head 320 converts the information stored in recorded media into electronic signals. For example, in a compact disc player embodiment read head 320 comprises a laser and a light detector to detect reflected light from the disk. Read head 320 is coupled to signal processing block 318.

Figure 4:
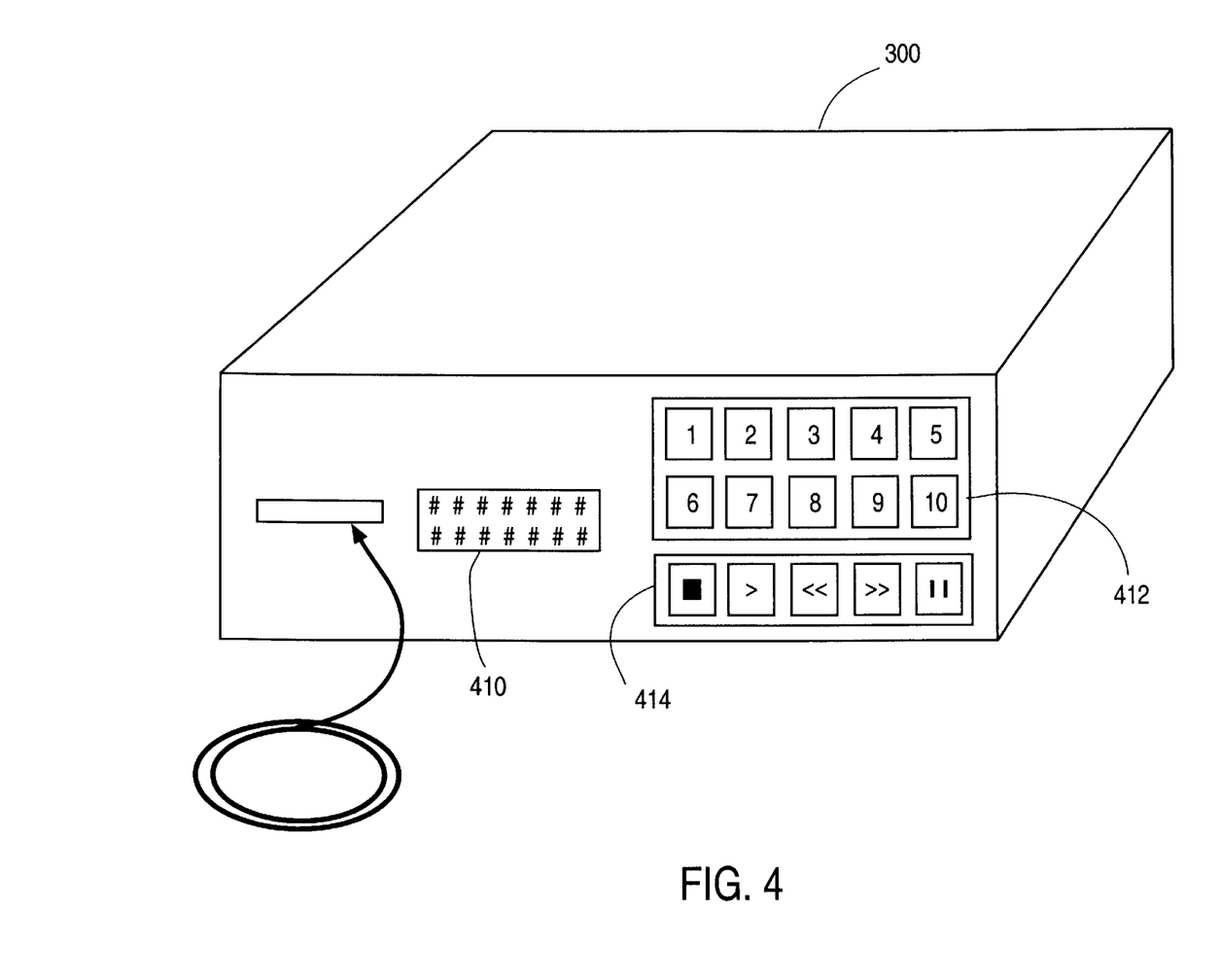
FIG. 4 illustrates the user interface of a playback unit of one embodiment of the present invention.

Signal processing block 318 is coupled to microcontroller 310 via node 350. For example, in one embodiment signal processing block 318 comprises amplifiers, filters, and digital to analog converters. Input keypad 322 is coupled to microcontroller 310 via node 350. One example of input keypad is illustrated in FIG. 4 comprising elements 412 and 414. Display 324 is coupled to microcontroller 310 via node 350. Optical scanner 326 is coupled to microcontroller 310 via node 350. In one embodiment, optical scanner 326 is a laser scanner to detect the location of reflective particles placed on the recorded media. The reflective particles provide the recorded media with a unique property independent of the recorded information in a format readable by read head 320. The operation of the elements shown in FIG. 3 is described in greater detail below in the context of their function in the authentic media protection system of the present invention.

2. DIGITAL SIGNATURE ENCRYPTION

The initial phase of the authentic media protection system of the present invention is directed to encoding recorded media with verifiable indicators of authenticity. In one embodiment, a unique digital signature and a list of known counterfeit media are encoded on each authorized recording.

Digitally encrypted signatures are essentially codes that are calculated with an enciphering function using input parameters from the object being signed. In one embodiment the digital signature recorded on authorized recorded media is computed using a public key encryption process. A "classical" cryptosystem is a cryptosystem in which the enciphering information can be used to determine the deciphering information. Public key encryption processes eliminate the difficulties of exchanging a secure enciphering key. By definition a public key cryptosystem has the property that someone who only knows how to encipher a message cannot use the enciphering key to find the deciphering key without a prohibitively lengthy computation. An enciphering function is chosen so that the calculations are relatively fast to compute. However, the inverse of the encrypting transformation is difficult, or computationally infeasible, to compute. Such a function is referred to as a "one way function" or as a "trap door function." The result is a digital signature whose correlation to the input parameters can be verified by a system that knows the encryption algorithm. However, given only the digital signature and the recorded medium it is very difficult to determine the encryption function, and therefore to calculate digital signatures for different input parameters. A more detailed description of public key encryption technology can be found in U.S. Pat. No. 5,271,061 entitled "METHOD AND APPARATUS FOR PUBLIC KEY EXCHANGE IN A CRYPTOGRAPHIC SYSTEM," the disclosure of which is hereby incorporated by reference.

Figure 2:
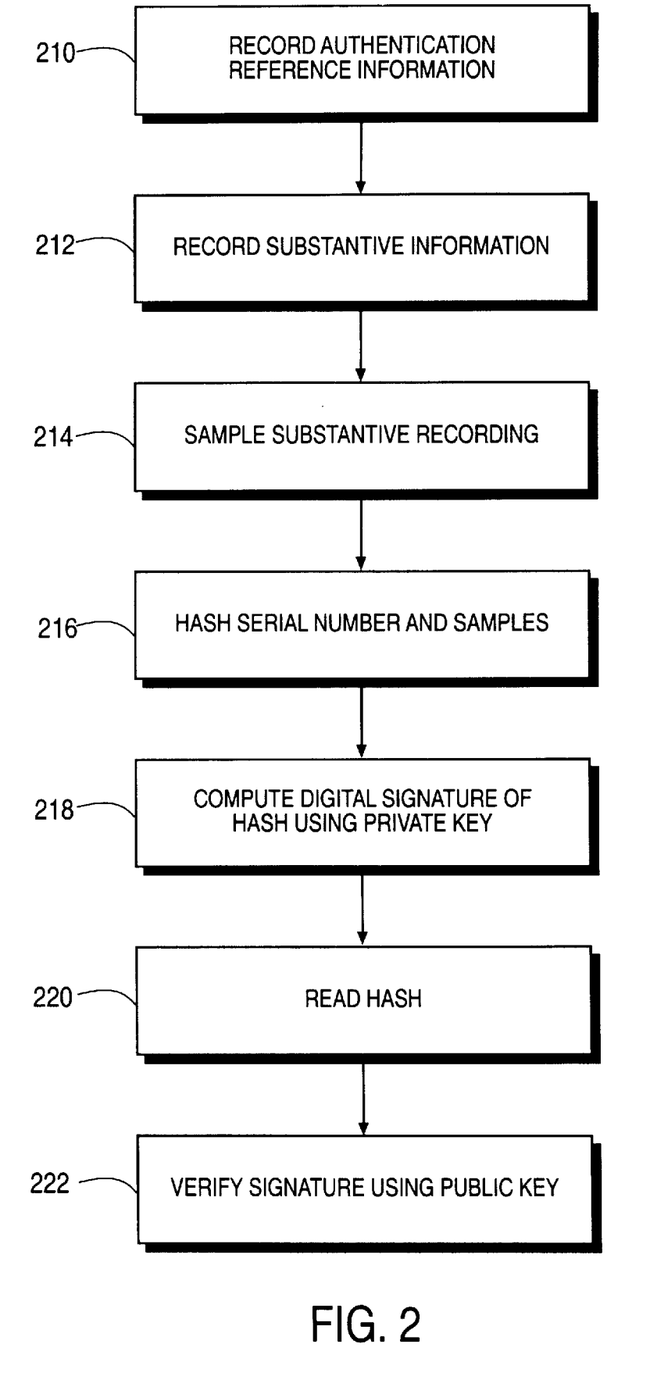
FIG. 2 illustrates one embodiment of the digital signature encryption and verification process of the present invention.

One embodiment of the present invention uses the Rivest Shamir and Adelman ("RSA") public key encryption scheme to compute digital signatures. As is well known by those of ordinary skill in the art, other public key encryption schemes can be used including the ElGamal scheme, and the elliptic curve scheme. One embodiment encryption and verification process is illustrated in FIG. 2. In step 210 the reference authentication information is recorded onto the media. For example, a unique serial number can be recorded on each recorded media. Also, as discussed below, a list of counterfeit media identifiers and related information can be recorded. In step 212 the substantive information is recorded. For example, for audio compact discs the substantive information is the music. In step 214 samples from the substantive recording are taken. The size of the samples can be defined based on the desired level of encryption protection. The greater the size of the samples used in the encryption process the more resistant the encryption is to being broken. However, the time required to encrypt signatures and to verify signatures also increases with the size of the encrypted information.

In step 216 microcontroller 310 hashes the serial number and samples. A hash function is a function, mathematical or otherwise, that takes an input string and converts it to a fixed-size (often smaller) output string. A simple hash function is a function that takes an input string and returns a byte consisting of the XOR of all the input bytes. The purpose of a hash function is to provide a finger print of the input string that is a fixed size and that can indicate whether a candidate string is likely to be the same as the input string. A one-way hash function is a hash function that is also a one-way function; it is easy to compute a hash value from an input string, but it is hard to generate a string that hashes to a particular value.

In the authentic media encryption process the hash provides a fixed size representation of the generally prohibitively long substantive recording. A one-way hash function can be used that returns a value on the order of 128 bits long, so that there are $2^{128}$ possible hashes. A digital signature is then computed based on the hash using the recorded media manufacturer's private key and the RSA encryption scheme. This digital signature is then recorded on the media.

When a playback unit begins to play a recorded media it verifies the authenticity of the digital signature stored on the recorded media, as in steps 220 and 222. The playback unit verifies the recorded digital signature using the public key verification process. In one embodiment the public key can be read from the recorded media. Alternatively, the public key can be included in microcontroller 310 firmware. If the digital signature does not verify then this indicates the media is not an authorized copy. For example, the media may have been produced by counterfeiters who modified the serial number but were not able to encrypt the proper digital signature to include the modified serial number. Upon detection of a counterfeit media the playback unit may execute a variety of responses as described in detail below. Maintaining the secrecy of the private keys prevents counterfeiters from being able to forge digital signatures because the desired digital signatures cannot be encrypted using the public keys. This system provides strong protection against counterfeiters creating their own serial numbers and encrypting digital signatures that would pass the verification process.

3. EVALUATING RECORDED MEDIA AUTHENTICITY

The digital signature authentication process makes it very difficult for counterfeiters to change the serial numbers and digital signatures on recorded media without being detected in the authentication process. Counterfeiters may be able to copy the entire recorded media including the original serial number and digital signature. One approach to detecting this form of counterfeit recorded media is to make available lists of recorded media identifiers that are known to have been copied by counterfeiters. A recorded media identifier is any code that is unique to a specific authorized recorded media. For example, a recorded media serial number or digital signature can be used as the identifier.

In one embodiment the playback unit stores a list of the recorded media the playback unit has played. For example, in one embodiment the playback unit stores a list of the recorded media serial numbers. In another embodiment the playback unit stores a list of the digital signatures. Before reading from a recorded media, the playback unit checks whether the recorded media includes a list of known counterfeit recorded media. If there is a list on the recorded media, the playback unit checks whether any of the known counterfeit recorded media are in the list of previously played recorded media stored in the playback units NVRAM. If the playback unit finds one of the previously played recorded media is now a known counterfeit recorded media then the playback unit executes a counterfeit media response routine. The system offers the powerful feature that a user of a counterfeit recording is faced with the risk of detection every time the playback unit reads from a new recorded media. This provides a substantial deterrent because of the ongoing risk of detection.

The playback unit can also store a list of known counterfeit recorded media, in addition to a list of recorded media the unit has played. Each recorded media of the present invention includes a list of known counterfeit recorded media identifiers. In one embodiment the playback unit reads this list before reading substantive content of the recorded media. The recorded media list of known counterfeit media can also include the title of each counterfeit media entry so that the playback unit can clearly identify for a user a counterfeit recorded media that has been played in the unit. In one embodiment the playback unit stores the list of known counterfeit media identifiers in NVRAM 312. To maximize the number of identifiers stored in NVRAM 312, the counterfeit media titles can be omitted from the NVRAM 312 list.

Recorded media manufacturers can include counterfeit recorded media serial numbers of only counterfeits of their own recordings, or they can also include known counterfeit serial numbers of other manufacturers as well. Storing a cumulative list of known counterfeit media in the playback unit also increases the likelihood that the playback unit will be able to detect a counterfeit recorded media when the user attempts to read from the recorded media. The playback unit can then immediately execute a counterfeit media response routine.

4. LIST STORAGE MANAGEMENT

Because of the long lifetime of playback units, after a large number of media have been played the list of previously played media and the list of counterfeit media is likely to exceed the storage capacity of the playback unit. There are numerous approaches to updating the lists so as to maximize the effectiveness of the authentic media protection system.

In one embodiment, a first-in-first-out (FIFO) approach is used. Here, the previously played media identifiers and known counterfeit media identifiers are stored in chronological order based on the date the identifiers were stored in the playback unit. When the storage capacity for one of these lists is exceeded the oldest identifiers are eliminated and the most recent entries are added to the list. This approach offers the advantage of simplicity of implementation and operation. It also is likely to favor the retention of the more recently played media and more recently listed counterfeit media. This is desirable because of the greater circulation of more recently counterfeited media over older media, corresponding to the general dominance of more recent recordings over older recordings.

Another approach to updating the stored lists is to randomly replace previously stored identifiers with new identifiers. In this embodiment, when the storage capacity is filled, and a new recorded media is checked before being played, the list of counterfeit media identifiers stored on the media and the recorded media identifier randomly replace previous entries in the respective lists. The randomness of the replacement provides the advantage that users are unlikely to be able to determine what identifiers are stored in the unit. This feature increases the difficulty of circumventing the authentic media protection system.

The FIFO and random replacement approaches can also be combined to provide the advantages of both systems. In this hybrid embodiment, identifiers are replaced based on a weighted probability where the identifiers that have been stored for a longer time are given a greater weight in a quasirandom selection process. The process is quasi-random in that microcontroller 310 generates a "random number," using a pseudo-random number generator and then uses that random number to select an identifier to replace. For example, for a list of 1000 identifiers, each identifier can be multiplied by a factor of one to ten based on the length of time the identifier has been stored. The weighted values can then be summed, and each identifier assigned a range of numbers in that sum based on the weighted value. Microcontroller 310 then generates a random number less than or equal to the total sum and the identifier corresponding to the range that the random number falls into is replaced.

In this hybrid embodiment, the longer an identifier is stored the more likely it is to be replaced; however, there remains a random component to provide an element of uncertainty. This uncertainty deters attempts to circumvent the authentic media protection system by making it more difficult for users to determine whether they will be able to play a counterfeit media without being detected. The storage management system can be further enhanced by checking whether an identifier is already stored in a list before recording the identifier; thereby avoiding storage of duplicate identifiers.

To increase the likelihood of storing identifiers for the most widely distributed known counterfeit media, the recorded media can store the list of known counterfeit media in a manner that reflects the magnitude of the distribution of the individual counterfeit recorded media. For example, a list of a predetermined size could be used to store the counterfeit media identifiers with the largest distribution. Playback units with limited or fill storage capacity may then limit the identifiers that they read to the list of the large distribution counterfeit media identifiers. Alternatively the recorded media can store the known counterfeit identifiers in order of the size of the distribution of the counterfeit media. This approach allows playback units to read a variable number of identifiers, based on their storage capacity, and still ensure that the counterfeit identifiers with the largest distribution are stored.

To further increase the resistance of the authentic media protection system to circumvention, the playback unit can delay replacing stored identifiers until after a recorded media has been playing for a predetermined amount of time. Similarly, the playback unit may limit the number of identifiers that it will store from any one recorded media.

5. LIST BASED DETECTION OF COUNTERFEIT MEDIA

In addition to the digital signature verification process, embodiments of the authentic media protection system of the present invention detect counterfeit media using lists of recorded media identifiers. When the playback unit reads the list of known counterfeit media that is stored on authorized recordings, the playback unit determines whether any of the identifiers of previously played recorded media is on this list. This approach to detecting counterfeit media offers the advantage that even if a counterfeit recorded media escapes detection when it is initially played it may still be detected at a later date when the playback unit reads new lists of known counterfeit media and compares these lists to the list of previously played media. This uncertainty is a strong deterrent because once a user plays a counterfeit recorded media, the user is unlikely to be able to determine whether they will be able to prevent the playback unit from detecting the counterfeit.

A second way that one embodiment of the playback unit may detect counterfeit recorded media is by comparing the counterfeit media identifier with a list of known counterfeit media stored in the playback unit. In this approach the playback unit reads the identifier from the recorded media. The playback unit compares this identifier with a cumulative list of known counterfeit media that the playback unit has obtained from lists stored on previous recorded media that it has read from. If the playback unit finds the identifier of the current recorded media on the list of known counterfeit media then the playback unit executes a counterfeit media response routine.

6. RECORDED MEDIUM BASED AUTHENTICATION

A medium based encoding scheme can also be used to authenticate recorded media in addition to the digital signature verification process, and the recorded media list based counterfeit media detection methods. One medium based encoding scheme encodes a unique feature of the particular recording medium in the digital signature. One embodiment uses a random distribution of reflective particles, for example, metallic particles, in a dedicated authentication area, which does not include substantive recording information. For example, a concentric area on the outer perimeter of the readable surface of a an optical recording disc can be dedicated for the purpose of media based authentication schemes and not used to record substantive material. This sector can be sufficiently small so as not to significantly affect the storage capacity of the recording medium. For example, for compact discs that store audio which are sampled at 48 KHz, using particles comparable in size to a single bit provides 48,000 potential particle locations for every unit of area of the disc that corresponds to one second of music that is used. The dedicated area can be initially covered with a non-reflective coating. The reflective particles can then be randomly distributed over the area, with a final coating applied to fix the position of the particles. Alternatively, the reflective particles can be suspended in a fluid coating and applied to the recording media in that form. The location of the particles can be read by the same optical scanner used to read the digital information. To maximize the difficulty of producing counterfeit media, the reflective properties of the dedicated authentication area can be made distinct from the reflective properties of the substantive area of the recorded media. This prevents the particle distribution pattern from being replicated using the same conventional recording technique used for the substantive recorded information. In an alternative embodiment, particles can be placed on the side of the disc that is not used for recording purposes.

The location of the particles can be combined with samples of the substantive content of the disc to generate a digital signature unique to that individual recording medium. This authentication method makes it nearly impossible to make a copy of a recorded media because the counterfeiter would have to replicate the location of all of the authenticating particles on the medium. This authentication approach also makes it very difficult for counterfeiters to produce recorded media that would escape detection because the manufacturer's private key that is used to produce the digital signature would be secret, and the availability of the equipment required to apply the particles to a disc would likely be far more limited than equipment to make a simple copy.

In another embodiment small perturbations in the recorded media are used to provide input specific to each recorded medium for the digital signature. Particles can be randomly inserted into the recording media substrate on selected tracks which expand or contract slightly after the tracks are recorded on the media. The expansion can be in the plane of the disk, the X-Y plane, or perpendicular to the surface of the disk, the Z direction. The particles can be inserted using a variety of techniques including doping processes similar to those used in fabricating semiconductor devices. These perturbations can be detected using, for example, conventional optical disk read heads. The playback unit can use either the perturbation in the position of the track as input for a digital signature and/or the perturbation in the timing of bits in the distorted areas. Information based on these perturbations can then be incorporated into the digital signature. The difficulty of replicating the locations of the perturbations makes producing counterfeits of the recorded media difficult. In another embodiment variations in the write frequency create the medium specific features which are encrypted in the digital signature.

7. COUNTERFEIT MEDIA RESPONSE ROUTINES

There are a large number of approaches to responding to the detection of a counterfeit media. The counterfeit media response serves the important purpose of providing an incentive directly to consumers to avoid counterfeit media. An unobtrusive response to the detection of a counterfeit media is to simply display a message on the playback unit display 410. The amount of information in the message is dependent on the capability of the display. For example, in a high end full size playback unit a liquid crystal display (LCD) could be provided capable of displaying text. For this type of display the playback unit can display a message indicating that a counterfeit media recording has been played, as well as other information depending on the way the counterfeit media was detected. To enhance the effect of the message it can be displayed for an extended period of time, for example, 24 hours. Where a counterfeit recorded media is detected by finding a match between the list of previously played recorded media stored in the playback unit and the list of known counterfeit media stored on a recorded media then a message can be displayed providing the title and an identifier of the counterfeit media that was played. This information is stored in the list of known counterfeit media stored on each recorded media.

Where counterfeit media is detected by matching the identifier of the counterfeit media with an identifier on the list of known counterfeit media stored in the playback unit, the only information that may be available on the counterfeit media is the identifier. This is because to maximize the storage capacity of the playback unit the list can be limited to just the recorded media identifiers and not titles of the recorded media or other information.

For displays with more limited display capability numerical codes can be displayed to indicate a counterfeit media has been detected. For example, for typical portable compact disc players the display often comprises only four digits to indicate the track number or elapsed time and several symbols to indicate the mode of operation of the player. In such a system, an error code such as "8888" can be used with accompanying instructions in the owners manual to explain the meaning of the code.

An incrementally stronger response to the detection of a counterfeit media recording is to disable reading from the recorded media. For example, the playback unit can check whether a recorded media is counterfeit before beginning to read from it. If any of the authenticity tests indicate the recorded media is a counterfeit the playback unit displays a counterfeit media detection message and stops reading from the disk.

To more strongly deter consumers from playing counterfeit media, upon detection of a counterfeit media recording the playback unit can shut down for a predetermined time. For example, upon detecting a counterfeit media recording, the playback unit could display a message identifying the counterfeit media that was played, and stating that the system will be unavailable for twelve hours. In one embodiment of this type of counterfeit media response, the playback unit sets a flag in NVRAM 312 to indicate that the playback unit has detected a counterfeit media and is locked. When the playback unit is powered up microcontroller 310 checks whether the counterfeit media flag is set before the playback unit reads from recorded media. In this manner, the playback unit prevents users from being able to unlock the unit by merely turning the power off. Microcontroller 310 also checks whether the counterfeit media flag is set before beginning to read from a recorded media each time it begins to read from a different recorded media.

To provide a still greater incentive to consumers to avoid counterfeit media, the playback unit can shut down upon detection of counterfeit media and require assistance from a third party service provider to restore functionality to the unit. In one embodiment, the playback unit can be "unlocked" by entering the appropriate unlock code. To obtain the unlock code consumers can call recorded media manufacturer's customer service centers. In one embodiment, part of the counterfeit media detection message is an instruction to call a customer service phone number to unlock the playback unit. For example, the playback unit may display a message that states, "COUNTERFEIT NUMBER 9 OF GONE WITH THE WIND DETECTED. PLAYBACK UNIT NUMBER 9,328,107. UNLOCK REFERENCE 3,857. CALL (800) ###-#### TO UNLOCK UNIT."

To unlock a playback unit the user calls up and informs a customer service representative of the counterfeit media detection message and the user's playback unit number. The customer service representative then provides an unlock number. An encrypted version of the unlock code is provided in the list of counterfeit media identifiers. The playback unit uses a public key and the recorded encrypted unlock code to verify the authenticity of the unlock number provided. If the unlock code entered does not correspond to the encrypted recorded unlock code then the playback unit remains locked. Providing the recorded encrypted unlock code and requiring public key verification of the unlock code provided to the user prevents counterfeiters from including unlock codes with the counterfeit media. This encryption scheme also prevents counterfeiters from determining the unlock code from the information provided with the recorded media.

In one embodiment, a different number is required to unlock each combination of playback unit and recorded media. This is accomplished by encrypting the unlock code provided to the user by the representative using the playback unit serial number, and including the playback unit serial number in the public key verification process. In one embodiment, each manufacturer has its own private key. Thus, in this embodiment a user has to call the manufacturer whose number is listed in the counterfeit detection display message. The manufacturer's counterfeit detection service number is stored in the list of known counterfeit media on the recorded media and in the playback unit. Alternatively, to increase the storage capacity of the playback unit a single customer service number can be provided and this central service center can then refer calls to the appropriate manufacturer customer service center using an automated telephone based menu driven service.

The customer service representative obtains the playback unit serial number, and the encrypted unlock number from the user based on the counterfeit media detection message. The representative then enters these numbers into a computer which uses the playback unit serial number, the encrypted unlock number, and the manufacturer's private key to compute the unlock code for that specific playback unit and counterfeit recorded media. Alternatively, the unlock code can be based on the media recording alone and not dependent upon the playback unit.

In another embodiment, the playback unit generates an unlock reference number using a pseudo-random number generator and displays this unlock reference number in the counterfeit media detection message. A user then provides this reference number to a customer service representative. The representative encrypts the reference using, for example, the manufacturer's private key and provides the encrypted unlock code to the user. The user can then enter this code into the playback unit which verifies the code using a public key verification process and upon successful verification unlocks the playback capability. Using a pseudo-random number for the unlock reference number offers the advantage that every time a counterfeit media is played the playback unit requires a new unlock code to unlock the unit. This feature can be used to prevent users from continuing to play a particular recorded media after they have obtained an unlock code for it.

For full size playback units, as illustrated in FIG. 4, users can enter the unlock code using the track number keypad 412. For smaller systems that may not have a separate track number keypad, the playback control buttons 414 can be used to enter the unlock code. For example, to enter the digit "4" the track skip/fast forward button can be depressed four times followed by the stop button. This numeric input embodiment can be similar in operation to the anti-theft code protection systems used in some car audio systems which require the entry of a code when the unit is disconnected from its power supply, as is well known by those of ordinary skill in the art.

In an alternative embodiment, users can be required to bring the playback unit into an authorized service center to unlock the unit after it has detected a counterfeit media. In this embodiment the unlock code may be used, but it may be required to be entered by an auxiliary device to further resist efforts by counterfeiters to circumvent the authentic media protection system. For example, the playback unit can include a connector inside the playback unit case. To unlock the unit a service technician opens the playback unit case, connects a computer system to the unit, and executes a program to unlock the playback unit.

The counterfeit media response routine can also be delayed. A counterfeit media may be detected when the list of known counterfeit media is read from an authorized recording and a counterfeit identifier is found in the list of previously played recorded media. In this case if the playback unit immediately executes the counterfeit media response routine users may in some way respond negatively to the recorded media being played when the message was displayed. For example, if users identify particular counterfeit media identifiers stored on a particular recorded media this may cause users to avoid playing that recorded media. This may apply generally to the extent any patterns are observed in the lists of counterfeit recorded media placed on recorded media. To minimize this effect the playback unit can delay executing a counterfeit media response routine for a predetermined length of time, for example, 24 hours. Alternatively, the playback unit can delay a counterfeit media response routine until after a random number of additional recorded media have been played, where the random number is in a predetermined range, for example between ten and twenty recorded media.

The digital authentic media protection system of the present invention also provides the opportunity to track distributors of counterfeit digital media. When a user calls to report that their playback unit has detected a counterfeit the customer service representative can inquire as to where the counterfeit media was purchased. Distributors of counterfeit media can therefore be monitored and this information can then be used to execute the required steps to restrict the distribution of counterfeit media.

Thus a method and apparatus for authenticating recorded media have been described. Although the present invention has been described with respect to certain specific embodiments, it will be clear to those skilled in the art that the inventive features of the present invention are applicable to other embodiments as well, all of which are intended to fall within the scope of the present invention.

I claim:

1. A method of authenticating recorded media comprising the steps of:

reading a first recorded media identifier from a first recorded media using a playback unit having a non-volatile memory;

storing the first recorded media identifier in a list of previously played recorded media identifiers in the playback unit non-volatile memory;

comparing the list of previously played recorded media with a list of counterfeit media identifiers stored on the first recorded media;

executing a counterfeit media response routine where an identifier in the previously played recorded media list matches an identifier in the counterfeit media list.

2. The method of authenticating recorded media of claim 1 further comprising the steps of:

storing said list of counterfeit media identifiers from the first recorded media in a cumulative list in the non-volatile memory of the playback unit;

comparing said first recorded media identifier with said cumulative non-volatile memory list of counterfeit media identifiers;

executing a counterfeit media response routine where said first recorded media identifier matches a recorded media identifier stored in said cumulative non-volatile memory list of counterfeit media identifiers.

3. The method of authenticating recorded media of claim 2 further comprising the steps of:

reading samples from predetermined locations on the recorded media;

reading a recorded digital signature from said recorded media;

verifying said recorded digital signature using said first recorded media identifier and said samples;

executing a counterfeit media response routine where said computed digital signature does not verify said recorded digital signature.

4. The method of authenticating recorded media of claim 1 wherein said step of executing a counterfeit media response routine comprises disabling the playback unit from reading from the recorded media identified as a counterfeit.

5. The method of authenticating recorded media of claim 1 wherein said step of executing a counterfeit media response routine comprises disabling the playback unit from reading any recorded media until the playback unit is unlocked.

6. The method of authenticating recorded media of claim 5 wherein said step of disabling the playback unit from reading any recorded media until the playback unit is unlocked further comprises:

generating a pseudo-random unlock reference number in the playback unit;

calculating an unlock code using an encryption process;

providing the unlock code to the playback unit;

verifying the unlock code using the playback unit.

7. The method of authenticating recorded media of claim 6 wherein said step of entering an unlock code comprises entering a code using a keypad on the playback unit.

8. The method of authenticating recorded media of claim 6 wherein said step of entering an unlock code comprises coupling an unlocking device to the playback unit and transmitting the unlock code to the playback unit.

9. The method of authenticating recorded media of claim 1 further comprising the steps of:

replacing a second recorded media identifier in said list of previously played recorded media identifiers with said first recorded media identifier.

10. The method of authenticating recorded media of claim 9 wherein said step of replacing a second recorded media identifier further comprises selecting said second recorded media identifier using a first in first out system.

11. A method of authenticating recorded media comprising the steps of:

reading a first recorded media identifier from a writeable layer of a recorded media;

reading samples from predetermined locations on said writeable layer of said recorded media;

reading a recorded digital signature from said writeable layer of said recorded media;

verifying said recorded digital signature using said first recorded media identifier and samples; and executing a counterfeit media response routine where said computer digital signature does not verify said recorded digital signature.

12. The method of authenticating recorded media of claim 11 wherein said step of verifying said recorded digital signature using said first recorded media identifier and said samples comprises performing a public key encryption process using said digital signature and said samples as input parameters.

13. The method of authenticating recorded media of claim 12 wherein said step of performing a public key encryption process further comprises the steps of:

computing a hash of said digital signature and said samples;

performing a public key encryption process on said hash.

14. A method of authenticating recorded media comprising the steps of:

storing an encrypted digital signature on a recorded media;

storing a list of counterfeit media on said recorded media;

reading a recorded media identifier from said recorded media using a playback unit having a non-volatile memory;

storing said recorded media identifier in a list of previously played recorded media in the playback unit non-volatile memory;

comparing the list of previously played recorded media with said list of counterfeit media identifiers stored on the recorded media; and executing a counterfeit media response routine where an identifier in the previously played recorded media list matches an identifier in the list of counterfeit media identifiers.

15. The method of authenticating recorded media of claim 14 further comprising the steps of:

reading a first recorded media identifier from said recorded media;

reading samples from predetermined locations on said recorded media;

reading a recorded digital signature using said first recorded media identifier and said samples;

executing a counterfeit media response routine where said computed digital signature does not verify said recorded digital signature.

16. The method of authenticating recorded media of claim 15 wherein said step of reading a recorded media identifier comprises detecting the reflection of light from said recorded media.

17. The method of authenticating recorded media of claim 16 further comprising the steps of:

distributing particles in random locations within a predetermined area on said recorded media;

identifying the locations of the distributed particles; and encoding locations of distributed particles in said digital signature.

18. The method of authenticating recorded media of claim 16 further comprising the steps of:

distributing particles in random locations within a predetermined area on said recorded media;

recording information on said recorded media;

measuring perturbations in the recorded information cause by the particles; and encoding information on the perturbations in said digital signature.

* * * * *